US 008665728 B2

(12) United States Patent
Altman

(10) Patent No.: US 8,665,728 B2
(45) Date of Patent: Mar. 4, 2014

(54) SYSTEM AND METHOD FOR IP TARGET TRAFFIC ANALYSIS

(75) Inventor: Yuval Altman, Herzeliya (IL)

(73) Assignee: Verint Systems, Ltd., Herzelia, Pituach (IL)

( * ) Notice: Subject to any disclaimer, the term of this patent is extended or adjusted under 35 U.S.C. 154(b) by 188 days.

(21) Appl. No.: 13/283,532

(22) Filed: Oct. 27, 2011

(65) Prior Publication Data
US 2012/0106378 A1 May 3, 2012

(30) Foreign Application Priority Data

Oct. 31, 2010 (IL) .......................................... 209008

(51) Int. Cl.
G01R 31/08 (2006.01)
(52) U.S. Cl.
USPC .......................................... 370/241; 370/252
(58) Field of Classification Search
None
See application file for complete search history.

(56) References Cited

U.S. PATENT DOCUMENTS

| 5,689,442 | A | 11/1997 | Swanson et al. |
| 6,404,857 | B1 | 6/2002 | Blair et al. |
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 8,176,495 | B2 * | 5/2012 | Sen et al. ...................... 718/105 |
| 2008/0014873 | A1 | 1/2008 | Krayer et al. |
| 2008/0261192 | A1 | 10/2008 | Huang et al. |
| 2008/0285464 | A1 * | 11/2008 | Katzir ........................... 370/241 |
| 2012/0106378 | A1 * | 5/2012 | Altman ......................... 370/252 |

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

(Continued)

Primary Examiner — Robert Wilson
(74) Attorney, Agent, or Firm — Meunier Carlin & Curfman

(57) ABSTRACT

Methods and systems for identifying network users who communicate with the network (e.g., the Internet) via a given network connection. The disclosed techniques analyze traffic that flows in the network to determine, for example, whether the given network connection serves a single individual or multiple individuals, a single computer or multiple computers. A Profiling System (PS) acquires copies of data traffic that flow through network connections that connect computers to the WAN. The PS analyzes the acquired data, attempting to identify individuals who login to servers.

16 Claims, 2 Drawing Sheets

(56) References Cited

OTHER PUBLICATIONS

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "R&S RA-CM Continuous Monitoring Software," Product Brochure, Radiomonitoring & Radiolocation, Jan. 2001, 16 pages.
Metronome SSL Inspector Solution Overview White Paper, "Examining SSL-encrypted Communications," 2010, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fisk, Mike, et al., "Applying Fast String Matching to Intrusion Detection," Los Alamos National Laboratory and University of California San Diego, 22 pages, date Jun. 1975.
Fox Replay BV, "FoxReplay Analyst," http//www.foxreplay.com, Revision 1.0, Nov. 2007, 5 pages.
Aho, Alfred V., et al., "Efficient String Matching: An Aid to Bibliographic Search," Communication of the ACM, Jun. 1975, vol. 18, No. 6, pp. 333-340.
Coffman, T., et al., "Graph-Based Technologies for Intelligence Analysis," CACM, Mar. 2004, 12 pages.
Cloudshield, Inc., "Lawful Intercept Next-Generation Platform," 2009, 6 pages.
Goldfarb, Eithan, "Mass Link Analysis: Conceptual Analysis," 2006, Version 1.1, 21 pages.
Verint Systems Inc., "Mass Link Analysis: Solution Description," Dec. 2008, 16 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Schulzrinne, H., et al., "RTP: A Transport Protocol for Real-Time Applications," Standards Track, Jul. 2003, 89 pages.
Sheng, Lei, "A Graph Query Language and Its Query Processing," IEEE, Apr. 1999, pp. 572-581.
Svenson, Pontus, "Social network analysis and information fusion for anti-terrorism," CIMI, 2006, 8 pages.
Tongaonkar, Alok S., "Fast Pattern-Matching Techniquest for Packet Filtering," Stony Brook University, May 2004, 44 pages.
Yu, Fang, et al., "Fast and Memory-Efficient Regular Expression Matching for Deep Packet Inspection," ANCS'06, Dec. 3-5, 2006, San Jose, California, 10 pages.

* cited by examiner

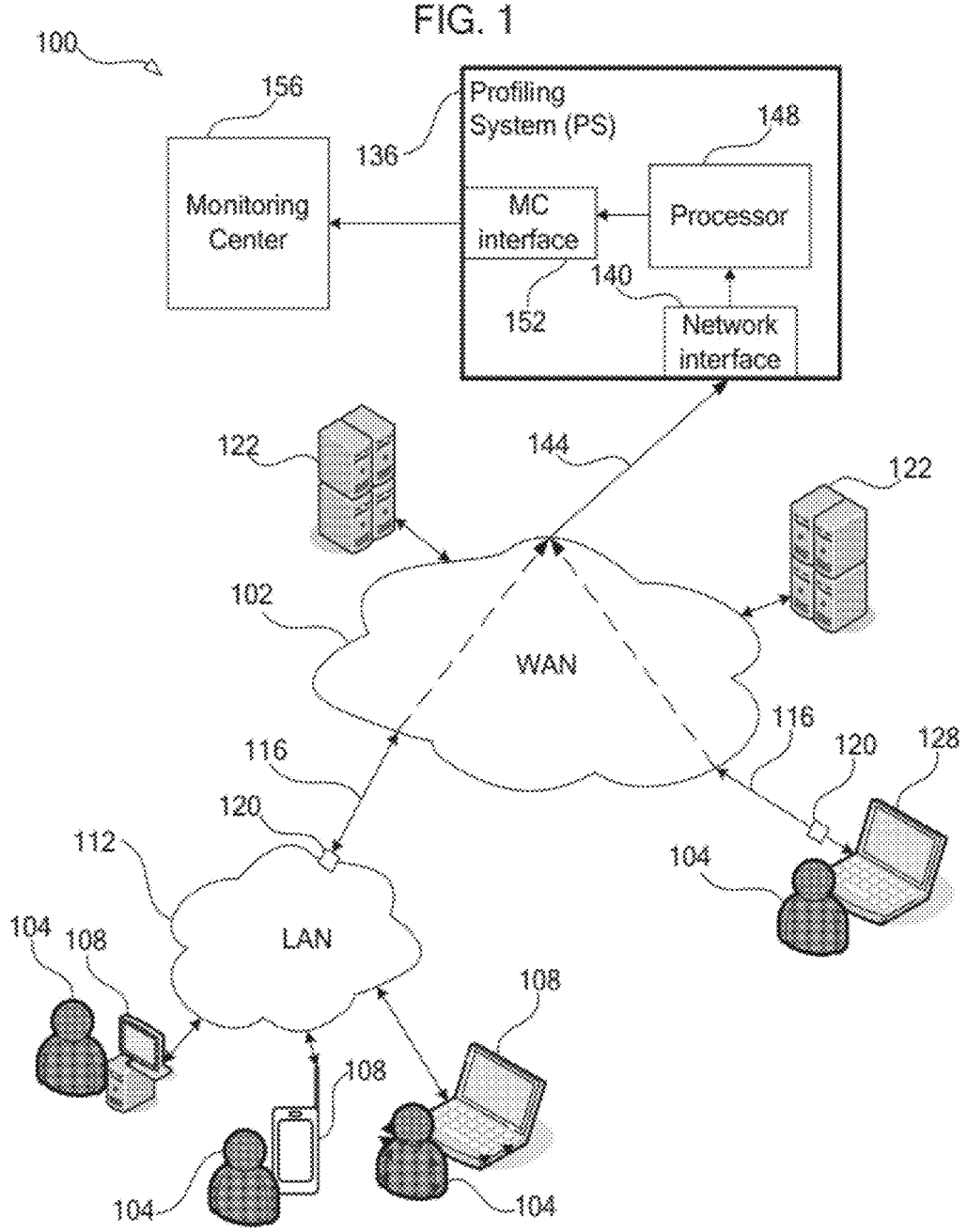

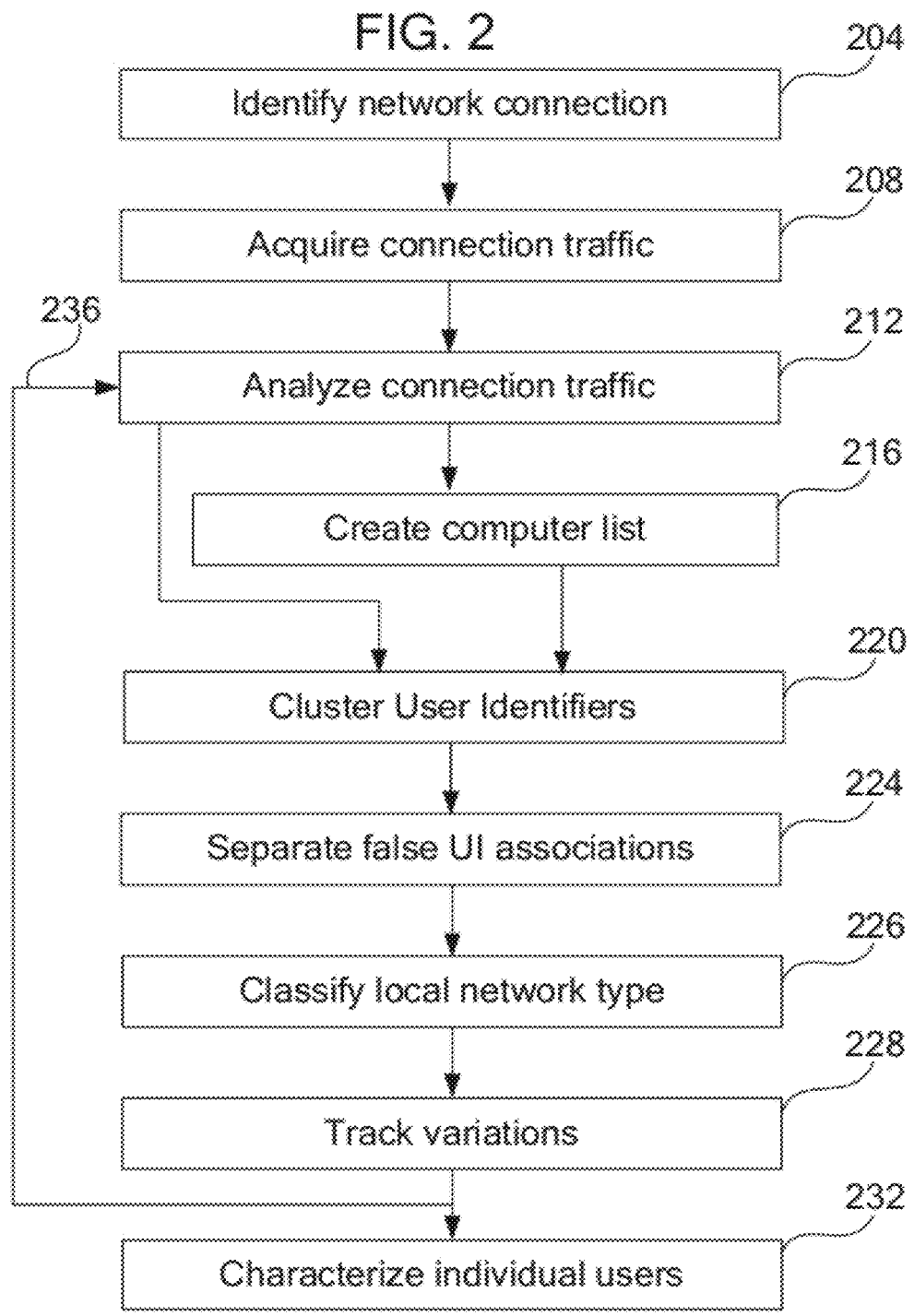

SYSTEM AND METHOD FOR IP TARGET TRAFFIC ANALYSIS

FIELD OF THE DISCLOSURE

The present disclosure relates generally to data communication, and particularly to methods and systems for identifying users of data communication networks.

BACKGROUND OF THE DISCLOSURE

Various techniques are used for identifying users of data communication networks, for various purposes such as user authentication and characterization of surfing habits of web users. Web applications usually recognize a user by username and password. However, a user can be identified in some web applications by other identifiers such as a nickname or an e-mail address.

U.S. Patent Application Publication 2008/0285464, whose disclosure is incorporated herein by reference, describes a method for communication analysis that includes monitoring communication sessions conducted by entities in a communication network. Identifiers that identify the entities are extracted from the monitored sessions. The identifiers extracted from the sessions are grouped in respective identity clusters, each identity cluster identifying a respective entity. A subset of the identity clusters, which includes identifiers that identify a target entity, is merged to form a merged identity cluster that identifies the target entity. An activity of the target entity in the communication network is tracked using the merged identity cluster.

SUMMARY OF THE DISCLOSURE

An embodiment that is described herein provides a method, including:

acquiring, from a network, data traffic that is associated with a network connection;

creating a list of one or more individuals who are served by the network connection by processing the acquired data traffic; and outputting the created list of the individuals.

In some embodiments, acquiring the data traffic includes acquiring login and logout events that are associated with the network connection, and creating the list includes identifying the individuals by analyzing the login and logout events. Creating the list may include identifying an individual on the list by detecting one or more User Identifiers (UIs) that the individual uses for login to one or more servers over the network, and associating the one or more UIs with the individual according to one or more association criteria.

In a disclosed embodiment, associating the UIs includes detecting at least one event selected from a group of events consisting of:

two or more UIs that are concurrently associated with active data transfer through a given computer that is served by the network connection;

two or more UIs having similar activity time patterns;

two or more UIs that are logged in during similar time patterns;

two or more UIs that that lexicographically similar and are concurrently logged in;

one or more events in which two or more UIs login simultaneously;

one or more events in which two or more UIs logout simultaneously; and a UI that is not associated with any other UI.

In an embodiment, creating the list includes identifying an individual who roams between the network connection and an additional network connection, by detecting a given UI in the data traffic of the network connection and in the data traffic of the additional connection. In another embodiment, creating the list includes distinguishing between two or more of the individuals by applying one or more disassociation criteria to User Identifiers (UIs) that the individuals use for login to one or more servers over the network.

In an embodiment, distinguishing between the individuals includes detecting two or more UIs that relate to a given application and are simultaneously associated with active data transfer. In another embodiment, distinguishing between the individuals includes distinguishing between first and second groups of the UIs that do not share any common UI, by detecting an event in which all the UIs in the first group simultaneously log out, and, after a time delay that is shorter than a predetermined value, all the UEs in the second group simultaneously log in.

In some embodiments, creating the list includes creating a first list of one or more computers that are served by the network connection, and creating a second list of the one or more individuals based on the first list. In an embodiment, the method includes refining the first list based on the second list. In an embodiment, acquiring the data traffic includes detecting in the data traffic events that are associated with the network connection, creating the list includes identifying the individuals by analyzing the events, and the events include at least one event type selected from a group of types consisting of computer start-up events, computer shut-down events and service registration events.

There is additionally provided, in accordance with an embodiment that is described herein, a method, including:

acquiring, from a network, data traffic that is associated with a network connection;

creating a list of one or more computers that are served by the network connection by processing the acquired data traffic; and outputting the created list of the computers.

There is also provided, in accordance with an embodiment that is described herein, apparatus, including:

an interface, which is configured to acquire, from a network, data traffic that is associated with a network connection; and a processor, which is configured to create a list of one or more individuals who are served by the network connection by processing the acquired data traffic.

There is further provided, in accordance with an embodiment that is described herein, apparatus, including:

an interface, which is configured to acquire, from a network, data traffic that is associated with a network connection; and a processor, which is configured to create a list of one or more computers that are served by the network connection by processing the acquired data traffic.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a system for identifying users of a data communication network, in accordance with an embodiment of the present disclosure; and FIG. 2 is a flowchart that schematically illustrates a method for identifying users of a data communication network, in accordance with an embodiment of the present disclosure.

DETAILED DESCRIPTION OF EMBODIMENTS

Overview

In various network configurations, a given network connection (e.g., an IP address) may serve a single computer or multiple computers, which may be used by a single individual or multiple individuals. For example, an IP address of a private home often serves a single computer and one or few individuals, whereas an IP address of an Internet Café typically serves a local network having multiple computers and multiple individuals. In some applications, it is desirable to profile the individuals and computers served by a given network connection, e.g., for surveillance purposes or for marketing-related network analysis.

Embodiments that are described herein provide methods and systems for identifying network users who communicate with the network (e.g., the Internet) via a given network connection. The disclosed techniques analyze traffic that flows in the network to determine, for example, whether the given network connection serves a single individual or multiple individuals, a single computer or multiple computers. Several example techniques and criteria for profiling network connections are described herein.

One or more computers that are served by a network connection are denoted herein as a "local network." A network that comprises the network connections is denoted as Wide Area Network (WAN). The WAN typically comprises an Internet Protocol (IP) network, e.g., the global Internet, although the techniques described herein may be used in other suitable network types such as an organizational intranet. The disclosed techniques focus on individual users, referred to as "individuals."

In an embodiment, A Profiling System (PS), which may be implemented as part of a monitoring center or as part of a network analysis server, acquires copies of data traffic that flow through network connections that connect computers to the WAN. As noted above, a given network connection may serve a single computer or multiple computers, and all of these configurations are referred to herein as "local network." The PS analyzes the acquired data, attempting to identify individuals who login to servers. A given individual is often concurrently logged in to multiple servers, using a respective User Identifier (UI) for accessing each server. In some local networks, e.g. those installed in offices or public places, the individuals may occasionally use different computers and may even connect to the WAN through more than one computer simultaneously, e.g. a desktop or a laptop and a smartphone. In this context, the UI is defined herein so as to include the name of the associated server or application, and therefore it is typically unique in the WAN. Several examples of UIs are given below.

In some embodiments, the PS identifies a given individual by finding a group of one or more UIs that this individual presumably uses for accessing servers over the WAN. Such a UI group is denoted herein as a "cluster," and the process of associating UIs to form a cluster are denoted as "UI clustering." The PS associates UIs and relates them to specific individuals according to some "association criteria" that are provided hereinbelow in detail. Certain aspects of UI clustering are addressed in U.S. Patent Application Publication 2008/0285464, cited above.

The association criteria are typically statistical and are based on typical habits of computer users, as well as on characteristic features of computer Operating Systems (OSs). Relying on such factors for analyzing data traffic, which involves multiple users and computers, may lead to statistical errors and consequently to false clustering decisions. The PS algorithm attempts to minimize the probability of such errors by interpreting events that may indicate unlikely associations. Furthermore, the PS typically runs the UI clustering process for every local network perpetually and iteratively, while attempting to detect variations in the observed local networks as well as mistaken decisions that were taken and correct the clustering process accordingly.

In some embodiments, the PS also attempts to detect UIs that roam between local networks. Once such a roaming UI is detected in the acquired traffic of two or more local networks, the PS attempts to identify the individual who uses that UI according to the UIs that this individual uses in the various local networks that he or she uses to connect to the WAN.

Identification of individual users, which is achieved by the disclosed techniques, may serve security agencies for tracking suspects' locations and actions. Commercial companies may also use the identification for characterizing habits and preferences of the identified individuals in connecting to remote applications in servers over the WAN. The analysis according to the disclosed techniques also provides listing of the computers that operate in the analyzed local networks. This listing may, for example, help Internet Service Providers (ISPs) to verify fair use of the Internet access that they provide their customers with.

System Description

FIG. 1 is a block diagram that schematically illustrates a system 100 for identifying users 104 of a WAN 102, in accordance with an embodiment of the present disclosure. In system 100, some individual users 104 connect through computers 108, a Local Area Network (LAN) 112, a network interface 120, a network connection 116 and WAN 102 to servers 122. The individuals typically use UIs for accessing the servers, as described in detail hereinbelow. A local network typically comprises one or more users who operate one or more computers. Computers 108 may be, as illustrated in FIG. 1, of various types such as a desktop, a laptop, a smartphone, an iPad or any other suitable computing machine.

Three computers are connected in FIG. 1 to LAN 112 as an example. However, embodiments may include local networks that comprise any number of computers. LAN 112 is typically a local IP network that comprises an IP router, having Ethernet and/or wireless access ports. Another local network example is a direct connection of a single computer to a network interface, as depicted in case of a computer 128. Network interfaces 120 are typically broadband access interfaces that comprise an Asymmetric Digital Subscriber Line (ADSL) modem, a cable modem, a Passive Optical Network (PON) interface, a wireless transceiver or any other suitable network interface.

Network connections 116 represent an access port of WAN 102, which is typically a part of some access network, not shown in the figure. Two network connections are depicted in FIG. 1 as an example. However, alternative embodiments may comprise any suitable number of network connections. Network connection 116 is commonly characterized by some logical identifier such as a constant IP address or Point to Point (PPP) related login and password strings. WAN 102, typically comprises an Internet Protocol (IP) network, e.g., the global Internet, although the embodiments described herein may comprise other suitable network types, e.g. an organizational intranet, an ISP network or any combination thereof.

Servers 122, which users 104 access through WAN 102, typically comprise application servers with web access, although other embodiments may comprise other server types such as video or audio download servers, Peer to Peer (P2P) servers wherein users are authenticated for joining P2P systems, servers of chat or instant messaging services such as ICQ and MSN messenger, web-based e-mail servers such as Gmail and Hotmail, servers of photo sharing services such as Picasa, or any other suitable servers that provide any other suitable services.

In some embodiments, a Profiling System (PS) 136 is connected to WAN 102 through a network interface 140 and network connection 144. Connection 144 typically comprises a Point-to-Point connection through which WAN 102 continually conveys to PS 136 copies of data traffic that flows through certain network connections 116. A processor 148 in PS 136 analyzes the acquired data so as to identify individual users as described hereinbelow in detail. PS 136 is realized, in typical embodiments, by a general purpose server platform. Processor 148 may be realized using one or more dedicated or general-purpose processor cores, which run software for carrying out the methods described herein. The software may be downloaded to the processor in electronic form, over a network, for example, or it may, alternatively or additionally, be provided and/or stored on non-transitory tangible media, such as magnetic, optical, or electronic memory. Processor 148 may be alternatively realized in hardware, typically comprising Field-Programmable Gate Arrays (FPGAs) and/or Application-Specific Integrated Circuits (ASICs), which optionally embed one or more processor cores.

Processor 148 analyzes the acquired traffic that pertains to a given network connection, and creates a list of individuals that are identified as being served by this network connection. Example techniques for distinguishing between different users based on the acquired traffic are described below. Processor 148 conveys the individual identification results as well as local network computer lists to a monitoring Center (MC) 156. The monitoring center is typically responsible for administrative aspects that are associated with the operation of PS 136.

The configuration of system 100 shown in FIG. 1 is an example configuration, which is chosen purely for the sake of conceptual clarity. In alternative embodiments, any other suitable system configuration can also be used.

The above system description focuses on the specific elements that are essential for understanding certain features of the disclosed techniques. Conventional elements of system 100 in general, and of PS 136 in particular, that are not essential for this understanding have been omitted from FIG. 1 for the sake of simplicity but will be apparent to persons of ordinary skill in the art. The arrow directions in FIG. 1 represent the transfer direction of the main information elements that were mentioned above, although information transfer in opposite directions may also take place.

Identification Method Description

FIG. 2 is a flowchart that schematically illustrates a method for identifying users of a data communication network, in accordance with an embodiment of the present disclosure. The method begins with a connection identification step 204, wherein some administration entity, which is related to MC 156 and WAN 102, determines a group of target network connections that are to be monitored. Each target network connection is identified by some connection identifier such as a constant IP address or Point to Point (PPP) related login and password strings. At a traffic acquirement step 208, WAN 102 acquires copies of the data traffic that flows through the target connections by copying the connections traffic through a "passive probe," a "mirror switch port," an "in-line tap," any other suitable network monitoring means or any combination thereof. The WAN then transfers the traffic copies thus acquired to PS 136 through network connection 144.

At a traffic analysis step 212, processor 148 in PS 136 analyzes the acquired data traffic, aiming to identify the individuals 104 who log in to servers 122. For analyzing the data that is acquired from a given network connection 116, processor 148 typically first tries to detect in the data various types of occurrences such as the following:

A login event: An individual logs in to an application that resides in some server 122 over WAN 102, using some Layer 7 (L7) or application specific UI such as a user-name, a nickname, a real name, an e-mail address, an access code, or any other suitable UI or a combination thereof. A UI is typically defined to include the application to which the individual user is logged in, hence, it is typically unique to the individual user. Following is a list of some example applications: Skype, ICQ, ICQ, MSN, MSN, AIM, AIM, Yahoo IM, Yahoo IM, SMTP, POPS, IMAP, SIP, SIP, Hotmail, Yahoo, IRC, IRC, Facebook, Gmail.

A login state: The session that started with a login event is still being maintained. This state refers to the logged-in individual, as well as to the associated UI.

An active UI: a UI that is associated with a session that currently involves data transfers to the server, wherein the transfers are initiated by the logged-in individual. This definition typically does not apply to data transfers that are initiated by an application that runs on the individual's computer, such an Ajax or Javascript.

Registration: An individual signing up for a service. This is a rare event but once it occurs it can relate UIs to other personal details.

After detecting occurrences of the above types, processor 148 logs them and attempts to either prove or disprove relations between them, as described hereinbelow in detail. In an embodiment, an occurrence is logged in a 3-tuple form [UI, occurrence type, occurrence time].

At a list creation step 216, processor 148 attempts to list, according to the acquired data traffic, computers that send messages to servers through each monitored network connection 116. The processor typically performs this task according to computer identifiers and computer-related attributes that are included in some messages that the computers output. Such attributes may comprise, for example, Hyper-Text Transfer Protocol (HTTP) UserAgent and cookie headers.

Other computer attributes may be detected when a computer starts up or shuts-off (e.g., when a starting-up computer checks for software version updates). Computer listing comprises also assessing the number of computers that are connected to a network connection that is being investigated. Several UIs that log out simultaneously, for example, may indicate shutdown of a computer. Hence, a sequence of several consecutive shutdown events may roughly indicate a minimal number of computers that are connected to the local network.

Listing computers that are connected to a given LAN 112 also typically comprises classification of the local network according to the usage of the computers by individual users. Individuals identification, which is necessary for the classification, is described hereinafter. The identification results are available at step 216 due to a flowchart path 236 that is described hereinafter as well.

At a clustering step 220, processor 148 attempts to identify a given individual, who is connected to a given local network, by finding a group of one or more UIs, i.e. UI1, UI2 ..., denoted as "cluster" that this individual presumably uses for accessing applications that reside in servers over the WAN. A cluster of a specific individual is denoted as "Individual Identifier Group" (IIG). An IIG that consists of a single UI is denoted as II. The process and method of associating UIs to form a cluster are denoted as "UI clustering." In some embodiments, processor 148 associates UIs and relates them to a specific individual according to the following association criteria:

- Detecting a UI2 that is concurrently active with some UI1/IIG on the same computer. The concurrency time resolution depends on the associated applications.
- Detecting a UI2 with activity time pattern similar to that of some UI1/IIG, during a sufficiently long time period, while the UIs are not necessarily associated with the same computer. This criterion may pertain, for example, to an individual who is concurrently connected to different servers through a desktop and a smart-phone.
- Detecting a UI2 with login state time pattern similar to that of some UI1/IIG, during a sufficiently long time period, while the UIs are not necessarily associated with the same computer. The required time resolution and period are typically longer than in the previous criterion.
- UI2 is concurrently logged in through the same computer as UI1/IIG, typically to different applications, and lexicographically resembles UI1/IIG.
- UI2 is concurrently logged in through the same computer as UI1/IIG, typically to different applications, while there is no lexicographical resemblance between UI2 and UI1/IIG. This criterion may sometimes be weaker than the previous one since an individual can leave a computer, which serves more than one user, without logging out from an application, and another individual can later login to another application through the same computer.
- UI2 and UI1/IIG are concurrently logged in, not necessarily through the same computer, typically to different applications, and UI2 lexicographically resembles UI1/IIG. The certainty of this criterion by itself is relatively low since it may lead to false conclusions in case of resembling individual names, either by chance or due to impersonation.
- Detecting several events in which UI2 login simultaneously with UI1/IIG, typically to different applications. In an embodiment the simultaneity resolution is about a few seconds. Such detection is quite a probable indication that an individual starts using a computer and logs in to multiple servers. A computer identifier is not necessary for this criterion.
- Detecting several events in which UI2 logouts simultaneously with UI1/IIG, typically from different applications. The certainty of this criterion is higher the more such events are detected within a given time period, and if lexicographical resemblance between UI2 and UI1/IIG is detected as well.
- Processor 148 declares a UI2 to be a single member IIG, i.e. an II, if UI2 is active from time to time but has not been associated with any UI1/IIG during a given time period, e.g. several days or weeks.
- Detecting several UIs in a single acquired message or session. An example of such an association is a login name and a real name in Instant Messaging (IM) that occur in the same login message. Another example is Multipurpose Internet Mail Extensions (MIME) email address and POP3 login name which occur during the same POP3 session.

As shown in FIG. 2 the computer list that processor 148 creates in step 216 also affects clustering step 220. As an example, a large number of computers in a local network would increase the probability that independent events, which relate to different computers, would occur within a given short period of time.

At a separation step 224, processor 148 separates IIGs that it finds as pertaining to different individuals. The processor bases such decisions on "disassociation criteria" such as:

- UI2 is simultaneously active with UI1 though both pertain to the same application. The rationale of this criterion is that a UI is normally unique in an application and an individual is seldom active simultaneously in more than one application. This criterion may not be valid in case of some specific applications.
- A group1 of several UIs simultaneously logs out and after a predefined short delay a group2 of several UIs logs in, wherein both groups do not share a common UI. The rationale of this criterion is that such an occurrence may indicate Operating System (OS)-user change on a computer, thus group1 UIs and group2 UIs probably pertain to different IIGs respectively.

At a classification step 226 processor 148 attempts to classify the type of each local network that it investigates according to the computer list, the identified individuals and the logged occurrences. Following is a list of typical local network types:

- Single computer
  - Single—single individual using the computer
  - Hotseat—more than one individual using the computer (but not a large number of individuals), all using the same OS user
  - Multi-user hotseat—more than one individual using the computer (but not a large number of individuals), description typical scenario indicative of an Internet Café
- Network—A small number of computers
  - Personal network—Single individual using the network—e.g. could be a home laptop+IPhone. Characterized by enough personal identities being used throughout activities of different computers.
  - Separated network—Each computer commonly used by one individual.
  - Shared network—Computers used interchangeably by several (but not many) individuals.
  - Closed public network—Computers used by changing individuals. This would be a good description of an Internet café with computers on-site.
- Open Public network—Many computers, many individuals. This would be a good description of a public WiFi-hotspot, hotel with Internet connections for laptops etc.

At a tracking step 228, processor 148 tracks variations in each monitored local network. Parameters that can change in a given local network may comprise, for example, identity of individuals who actually connect to the local network, UIs that are in use, number of computers, computer attributes, local network type etc. Processor 148 updates the analysis correspondingly and continues it iteratively as illustrated by loop path 236 in the flowchart. A particular kind of local network variation is roaming of a specific UI between local networks. Once such a roaming UI is detected in the acquired traffic of two or more network connections 116, the processor attempts to identify the individual who uses that UI according to all the UIs that he presumably uses in the various local networks through which he uses to connect to the WAN. At a characterization step 232, processor 148 further analyzes the monitored data traffic for characterizing habits and preferences of the identified individuals in connecting to remote applications in servers over the WAN.

For a given monitored network connection, processor 148 may provide various outputs. For example, processor 148 may output a list of individuals that are identified as served by the network connection, a list of computers that are identified as served by the network connection, an indication of the class to which the network connection belongs (e.g., single-computer single-user, single-computer multi-user, multi-computer multi-user), or any subset of these output types.

The flowchart shown in FIG. 2 is an example flowchart, which is chosen purely for the sake of conceptual clarity. In alternative embodiments, any other suitable flowcharts can also be used for realizing the disclosed methods. In particular, the above clustering and exclusion criteria were given only as example criteria and other or different criteria can be used in other embodiments. Although the embodiments described herein mainly address individual user identification systems, the methods and systems exemplified by these embodiments can also be used in other applications that involve user and network elements identification.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
acquiring, from a network, data traffic that is associated with a network connection;
analyzing the data traffic so as to identify individual users;
creating a list of one or more individuals who are served by the network connection by processing the acquired data traffic, wherein creating the list comprises distinguishing between two or more of the individuals by applying one or more disassociation criteria to User Identifiers (UIs) that the individuals use for login to one or more servers over the network, and further wherein distinguishing between the individuals comprises distinguishing between first and second groups of the UIs that do not share any common UI, by detecting an event in which all the UIs in the first group simultaneously log out, and, after a time delay that is shorter than a predetermined value, all the UIs in the second group simultaneously log in; and
outputting the created list of the individuals.

2. The method according to claim 1, wherein acquiring the data traffic comprises acquiring login and logout events that are associated with the network connection, and wherein creating the list comprises identifying the individuals by analyzing the login and logout events.

3. The method according to claim 1, wherein creating the list comprises identifying an individual on the list by detecting one or more User Identifiers (UIs) that the individual uses for login to one or more servers over the network, and associating the one or more UIs with the individual according to one or more association criteria.

4. The method according to claim 3, wherein associating the UIs comprises detecting at least one event selected from a group of events consisting of:
two or more UIs that are concurrently associated with active data transfer through a given computer that is served by the network connection;
two or more UIs having similar activity time patterns;
two or more UIs that are logged in during similar time patterns;
two or more UIs that that lexicographically similar and are concurrently logged in;
one or more events in which two or more UIs login simultaneously;
one or more events in which two or more UIs logout simultaneously; and
a UI that is not associated with any other UI.

5. The method according to claim 3, wherein creating the list comprises identifying an individual who roams between the network connection and an additional network connection, by detecting a given UI in the data traffic of the network connection and in the data traffic of the additional connection.

6. The method according to claim 1, wherein distinguishing between the individuals comprises detecting two or more UIs that relate to a given application and are simultaneously associated with active data transfer.

7. The method according to claim 1, wherein creating the list comprises creating a first list of one or more computers that are served by the network connection, and creating a second list of the one or more individuals based on the first list.

8. The method according to claim 7, and comprising refining the first list based on the second list.

9. The method according to claim 1, wherein acquiring the data traffic comprises detecting in the data traffic events that are associated with the network connection, wherein creating the list comprises identifying the individuals by analyzing the events, and wherein the events comprise at least one event type selected from a group of types consisting of computer start-up events, computer shut-down events and service registration events.

10. Apparatus, comprising:
an interface, which is configured to acquire, from a network, data traffic that is associated with a network connection; and
a processor, which is configured to analyze the data traffic so as to identify individual users; and create a list of one or more individuals who are served by the network connection by processing the acquired data traffic, wherein creating the list comprises distinguishing between two or more of the individuals by applying one or more disassociation criteria to User Identifiers (UIs) that the individuals use for login to one or more servers over the network, and further wherein distinguishing between the individuals comprises distinguishing between first and second groups of the UIs that do not share any common UI, by detecting an event in which all the UIs in the first group simultaneously log out, and, after a time delay that is shorter than a predetermined value, all the UIs in the second group simultaneously log in.

11. The apparatus according to claim 10, wherein the processor is configured to identify an individual on the list by detecting one or more User Identifiers (UIs) that the individual uses for login to one or more servers over the network, and associating the one or more UIs with the individual according to one or more association criteria.

12. The apparatus according to claim 11, wherein the processor is configured to associate the UIs by detecting at least one event selected from a group of events consisting of:
- two or more UIs that are concurrently associated with active data transfer through a given computer that is served by the network connection;
- two or more UIs having similar activity time patterns;
- two or more UIs that are logged in during similar time patterns;
- two or more UIs that that lexicographically similar and are concurrently logged in;
- one or more events in which two or more UIs login simultaneously;
- one or more events in which two or more UIs logout simultaneously; and
- a UI that is not associated with any other UI.

13. The apparatus according to claim 11, wherein the processor is configured to identify an individual who roams between the network connection and an additional network connection by detecting a given UI in the data traffic of the network connection and in the data traffic of the additional connection.

14. The apparatus according to claim 10, wherein the processor is configured to distinguish between the individuals by detecting two or more UIs that relate to a given application and are simultaneously associated with active data transfer.

15. The apparatus according to claim 10, wherein the processor is configured to create a first list of one or more computers that are served by the network connection, and to create a second list of the one or more individuals based on the first list.

16. The apparatus according to claim 15, wherein the processor is configured to refine the first list based on the second list.

* * * * *